United States Patent
Ogino et al.

(10) Patent No.: US 7,132,184 B2
(45) Date of Patent: Nov. 7, 2006

(54) FUEL CELL SYSTEM

(75) Inventors: Shigeru Ogino, Toyota (JP); Satoshi Aoyama, Susono (JP); Hiroyuki Mitsui, Nagoya (JP); Hiroshi Aoki, Nagoya (JP); Takashi Shimazu, Nagoya (JP); Satoshi Shiokawa, Fuji (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/229,498

(22) Filed: Sep. 20, 2005

(65) Prior Publication Data
US 2006/0014064 A1    Jan. 19, 2006

Related U.S. Application Data

(63) Continuation of application No. PCT/JP05/00802, filed on Jan. 17, 2005.

(30) Foreign Application Priority Data
Jan. 19, 2004    (JP)    ............................. 2004-010837

(51) Int. Cl.
    H03M 8/18    (2006.01)
(52) U.S. Cl. ............................. 429/20; 429/19; 429/24; 429/25; 429/26; 429/34; 429/38; 429/39
(58) Field of Classification Search .................. 429/19, 429/20, 24, 25, 26, 34, 38, 39
See application file for complete search history.

(56) References Cited

U.S. PATENT DOCUMENTS

| 4,539,267 | A   | * | 9/1985 | Sederquist ..................... 429/17 |
| 6,514,634 | B1  | * | 2/2003 | Rush, Jr. ...................... 429/17 |
| 2002/0081473 | A1 | * | 6/2002 | Hanai et al. ................... 429/26 |

FOREIGN PATENT DOCUMENTS

| JP | A 57-212777  | 12/1982 |
| JP | A 61-190865  | 8/1986  |
| JP | A 2-197057   | 8/1990  |
| JP | A 2002-087802 | 3/2002 |
| JP | A 2003-095608 | 4/2003 |
| JP | A 2003-151599 | 5/2003 |

* cited by examiner

*Primary Examiner*—Bruce F. Bell
(74) *Attorney, Agent, or Firm*—Oliff & Berridge, PLC

(57) ABSTRACT

The fuel cell system according to the present invention comprises a reformer 12 for receiving a hydrocarbon fuel supply and generating a hydrogen-containing reformed gas by making use of a reforming reaction; a fuel cell assembly 14 for generating power after causing an anode to receive the reformed gas and causing a cathode to receive an oxygen-containing cathode gas; cathode off-gas supply flow path 20 for supplying a cathode off-gas, which is discharged from the cathode, to the reformer 12; and bypass flow path 24 for bypassing the cathode and directly supplying the cathode gas to the reformer 12 at the time of system warm-up.

9 Claims, 3 Drawing Sheets

FUEL CELL SYSTEM

This is a Continuation of Application No. PCT/JP2005/000802 filed Jan. 17, 2005, which claims the benefit of Japanese Patent Application No. JP 2004-010837 filed Jan. 19, 2004. The entire disclosure of the prior application is hereby incorporated by reference herein in its entirety.

TECHNICAL FIELD

The present invention relates to a fuel cell system, and more particularly to a fuel cell system having a reforming section that generates hydrogen from hydrocarbon fuel by making use of reforming reaction.

BACKGROUND ART

When a fuel cell assembly is to be used as a generator, it is necessary to supply hydrogen to a fuel cell assembly anode. A known method for acquiring hydrogen from gasoline, methanol, natural gas, or other hydrocarbon fuel by making use of reforming reaction is used to generate the hydrogen to be supplied to the anode.

There are various reforming reactions such as steam reforming reaction and partial oxidation reaction. As an example, the reforming reaction of isooctane ($C_8H_{18}$), which is an element of gasoline, is described below.

$$C_8H_{18} + 8H_2O \rightarrow 8CO + 17H_2 \quad (1)$$

$$C_8H_{18} + 4O_2 \rightarrow 8CO + 9H_2 \quad (2)$$

The reaction indicated by Equation (1) above is a steam reforming reaction. The reaction indicated by Equation (2) above is a partial oxidation reaction. The steam reforming reaction is an endothermic reaction. The partial oxidation reaction is an exothermic reaction. These reactions generally occur in a reactor vessel called a reformer. Either or both of these reforming reactions can be set to occur in a single reformer.

The operating temperature of a fuel cell assembly is approximately 80° C. for a proton exchange membrane fuel cell (PEM), which entails the lowest operating temperature, or as high as 1000° C. for a certain solid oxide fuel cell (SOFC). To generate power, therefore, it is necessary to warm up the fuel cell assembly to the operating temperature. A technology for supplying a cathode off-gas, which is discharged from a fuel cell assembly cathode, to the reformer for circulation purposes is disclosed by Japanese Patent Laid-Open No. 151599/2003. At system startup, the disclosed technology exercises control so that the amount of cathode off-gas supply to the reformer is about four times the air amount corresponding to the theoretical air-fuel ratio, and supplies high-temperature gas exhaust from the reformer to the anode for fuel cell assembly warm-up purposes.

However, when a cathode gas is supplied to the fuel cell assembly at the time of warm-up and the cathode off-gas exhaust from the fuel cell assembly is supplied to the reformer, the cathode gas unexpectedly cools the fuel cell assembly because the cathode gas is air having an ordinary temperature. Thus, the warm-up of the system including the fuel cell assembly takes a considerable amount of time. Consequently, it takes a long period of time before power is actually obtained from the fuel cell assembly.

The present invention has been made to solve the above problem. It is an object of the present invention to minimize the time required for warm-up when a fuel cell system is to be started up.

DISCLOSURE OF INVENTION

According to a first aspect of the present invention, there is provided a fuel cell system comprising a reforming section for receiving a hydrocarbon fuel supply and generating a hydrogen-containing reformed gas by making use of a reforming reaction; a fuel cell assembly for generating power after causing an anode to receive the reformed gas and causing a cathode to receive an oxygen-containing cathode gas; cathode off-gas supply means for supplying a cathode off-gas, which is discharged from the cathode, to the reforming section; and bypass means for bypassing the cathode and directly supplying the cathode gas to the reforming section at the time of system warm-up.

Since the cathode is bypassed at the time of system warm-up to directly supply the cathode gas to the reforming section, it is possible to inhibit the cathode gas from cooling the fuel cell assembly. Consequently, the warm-up efficiency can be raised to complete a fuel cell assembly warm-up process within a short period of time.

According to a second aspect of the present invention, there is provided the fuel cell system as described above, wherein the cathode gas supplied to the reforming section provides a lean burn of the hydrocarbon fuel at the time of system warm-up.

Since the cathode gas supplied to the reforming section provides a lean burn of hydrocarbon fuel, the heat generated during the lean burn can be used to properly warm up the interior of the system including the reforming section and fuel cell assembly.

According to a third aspect of the present invention, there is provided the fuel cell system as described above, wherein the cathode off-gas supplied to the reforming section and the hydrocarbon fuel are used as materials to generate the reformed gas after completion of system warm-up.

Since the cathode off-gas and the hydrocarbon fuel supplied to the reforming section are used as materials to generate a reformed gas, steam and oxygen in the cathode off-gas can be used for a reforming reaction. Thus, the overall system efficiency can be enhanced.

According to a fourth aspect of the present invention, there is provided the fuel cell system as described above, further comprising cooling fluid supply means for supplying a cooling fluid to the fuel cell assembly; and cooling fluid supply shutoff means for shutting off the supply of the cooling fluid at the time of system warm-up.

Since the supply of the cooling fluid to the fuel cell assembly can be shut off at the time of system warm-up, the warm-up efficiency can be enhanced.

According to a fifth aspect of the present invention, there is provided a fuel cell system comprising a reforming section for receiving a hydrocarbon fuel supply and generating a hydrogen-containing reformed gas by making use of a reforming reaction; a fuel cell assembly for generating power after causing an anode to receive the reformed gas and causing a cathode to receive an oxygen-containing cathode gas; cathode off-gas supply means for supplying a cathode off-gas, which is discharged from the cathode, to the reforming section; cooling gas supply means for supplying a cooling gas to the fuel cell assembly; and means for bypassing the fuel cell assembly and supplying the cooling gas to the reforming section at the time of system warm-up.

Since the fuel cell assembly is bypassed to supply the cooling gas to the reforming section at the time of system warm-up, it is possible to inhibit the cooling gas from cooling the fuel cell assembly. Consequently, the warm-up efficiency can be raised to complete a fuel cell assembly warm-up process within a short period of time.

According to a sixth aspect of the present invention, there is provided the fuel cell system as described above, further comprising cathode gas supply shutoff means for shutting off the supply of the cathode gas to the cathode at the time of system warm-up.

Since the supply of the cathode gas can be shut off at the time of system warm-up, it is possible to inhibit the cathode gas from cooling the fuel cell assembly.

According to a seventh aspect of the present invention, there is provided the fuel cell system as described above, wherein the cooling gas supplied to the reforming section provides a lean burn of the hydrocarbon fuel at the time of system warm-up.

Since the cooling gas supplied to the reforming section provides a lean burn of the hydrocarbon fuel, the heat generated during the lean burn can be used to properly warm up the interior of the system including the reforming section and fuel cell assembly.

According to an eighth aspect of the present invention, there is provided a fuel cell system comprising a reforming section for receiving a hydrocarbon fuel supply and generating a hydrogen-containing reformed gas by making use of a reforming reaction; a fuel cell assembly for generating power after causing an anode to receive the reformed gas and causing a cathode to receive an oxygen-containing cathode gas; cathode off-gas supply means for supplying a cathode off-gas, which is discharged from the cathode, to the reforming section and/or cooling gas supply means for supplying a cooling gas to the fuel cell assembly; gas supply shutoff means for shutting off at least either the supply of the cathode gas to the cathode or the supply of the cooling gas to the fuel cell assembly at the time of system warm-up; and lean-burn gas supply means for supplying a gas to the reforming section to provide a lean burn of the hydrocarbon fuel at the time of system warm-up.

Since at least either the supply of the cathode gas or the supply of the cooling gas to the fuel cell assembly is shut off at the time of system warm-up, it is possible to inhibit the fuel cell assembly from being cooled by the cathode gas or cooling gas. Consequently, the warm-up efficiency can be raised to complete a fuel cell assembly warm-up process within a short period of time. Further, the gas supplied from the lean-burn gas supply means provides a lean burn of the hydrocarbon fuel. Therefore, the heat generated during the lean burn can be used to properly warm up the interior of the system including the reforming section and fuel cell assembly.

According to a ninth aspect of the present invention, there is provided the fuel cell system as described above, wherein the supply of the cathode gas to the cathode and the supply of the cooling gas to the fuel cell assembly are both shut off at the time of system warm-up.

Since the supply of the cathode gas and the supply of the cooling gas to the fuel cell assembly are both shut off at the time of system warm-up, the warm-up efficiency can be enhanced.

BEST MODE OF CARRYING OUT THE INVENTION

Figure 1A:
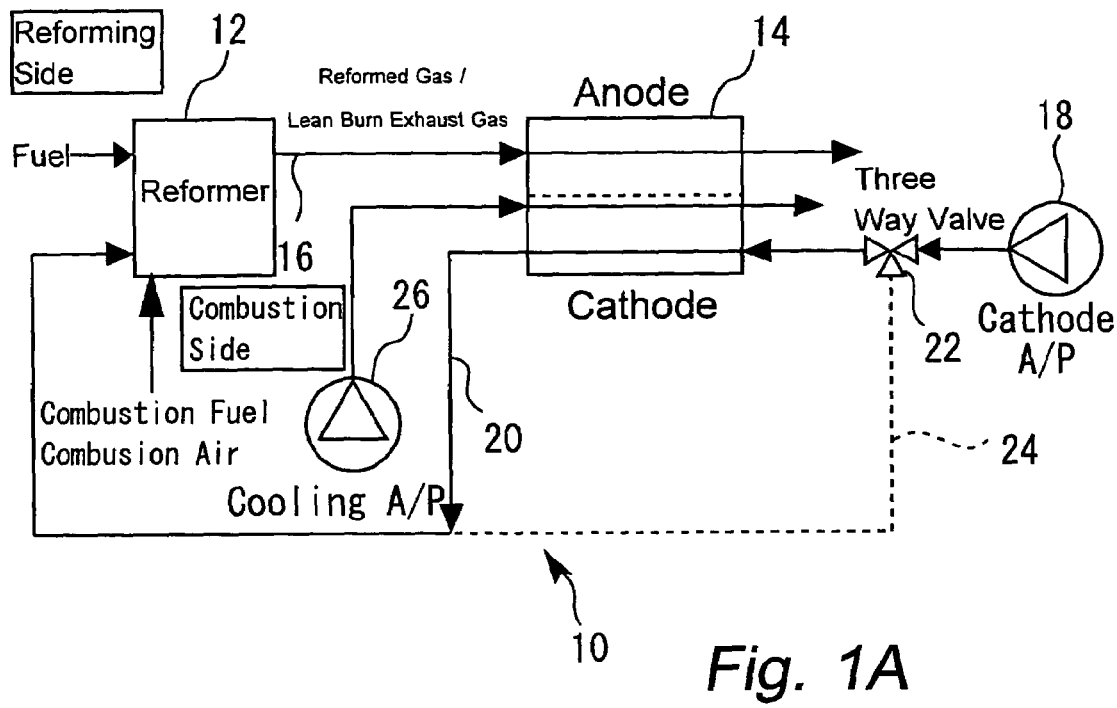
FIGS. 1A and 1B are schematic diagrams illustrating the configuration of a fuel cell system according to a first embodiment of the present invention.

Embodiments of the present invention will now be described with reference to the accompanying drawings. Like elements in the drawings are designated by like reference numerals and will not be described repeatedly. The present invention is not limited to the embodiments described below.

First Embodiment

Figure 1B:
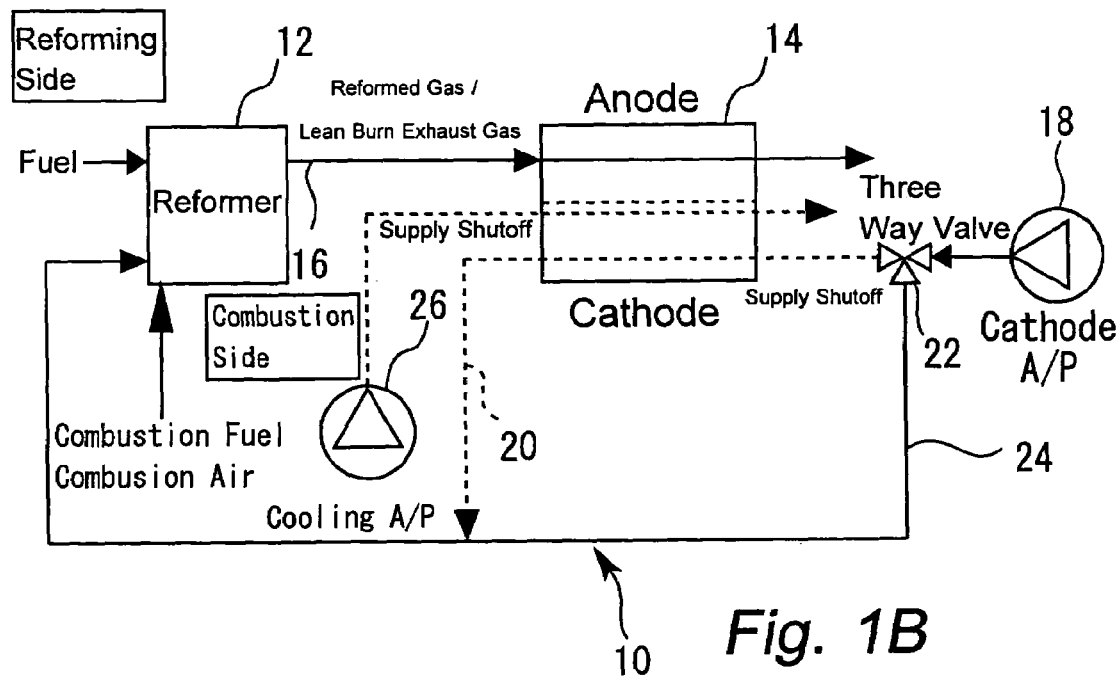

FIGS. 1A and 1B are schematic diagrams illustrating the configuration of a fuel cell system according to a first embodiment of the present invention. The fuel cell system 10 mainly includes an externally heatable, heat exchanger type reformer 12 and a fuel cell assembly 14. The reformer 12 uses hydrocarbon fuel, water, and air as materials to generate a hydrogen-rich fuel gas (reformed gas). The fuel cell assembly 14 generates power by using the reformed gas as fuel and air as oxidation gas.

The fuel cell assembly 14 is acceptable as far as it generates water (steam) at the time of power generation. More specifically, a proton exchange membrane fuel cell (PEM), phosphoric acid (PAFC), or hydrogen separation membrane fuel cell assembly may be used. If, for instance, the employed fuel cell assembly 14 is of a proton exchange membrane fuel cell, it comprises multi-layered cells, which each includes an electrolytic membrane, an anode, a cathode, and a separator. A fuel gas (reformed gas) flow path and an oxidation gas flow path are formed between the anode and cathode. The electrolytic membrane is a proton-conductive ion-exchange membrane that is formed with fluorocarbon resin or other solid polymer material. The anode and cathode are both formed with carbon cloth that is made of carbon fiber. The separator is formed with a gas-impermeable conductive member such as compact carbon, which is rendered gas-impermeable by compressing carbon.

The reformer 12 can be functionally divided into a reforming side and a combustion side. The reforming side invokes a reforming reaction as indicated by Equations (1) and (2). The combustion side supplies heat to invoke a reforming reaction. Gasoline that contains isooctane ($C_8H_{18}$) is supplied to the reforming side as fuel. Steam and air (oxygen) are also supplied to the reforming side. The gasoline, steam, and air, which are supplied to the reforming side, are used to invoke a reforming reaction as indicated by Equations (1) and (2). As the fuel to be supplied to the reforming side, natural gas or other hydrocarbon fuel, alcohol or other oxygen-containing fuel, or other hydrocarbon fuel may be used. In addition, ether or aldehyde can also be used as the fuel.

The reforming side includes a reforming catalyst to quicken the reforming reaction. When gasoline or natural gas is used as a material, a nickel catalyst or rhodium precious metal may be used as the reforming catalyst. It is known that CuO—ZnO catalysts and Cu—ZnO catalysts are effective catalysts when methanol is used as the material.

Combustion fuel and combustion air are supplied to the combustion side of the reformer 12. The combustion fuel is burned to generate the heat for a reforming reaction. The combustion side of the reformer 12 may include a dedicated combustor which is separated from the reformer 12. In this instance, the combustion fuel and combustion air are burned in the combustor, and a high-temperature combustion gas, which is discharged from the combustor, is used to supply the heat for a reforming reaction.

When heat is supplied from the combustion side of the reformer 12 as described above, the gasoline, steam, and air (oxygen) supplied to the reforming side react. Thus, the steam reforming reaction and partial oxidation reaction indicated by Equations (1) and (2) both occur. These reactions are quickened by the reforming catalyst so that a hydrogen-rich reformed gas is generated.

The hydrogen-rich reformed gas, which is derived from the reforming reaction, is supplied to the anode of the fuel cell assembly 14 via a reformed gas flow path 16. Meanwhile, air (cathode gas) is supplied to the cathode of the fuel cell assembly 14 as the oxidation gas. When the reformed gas is supplied to the anode of the fuel cell assembly 14, a hydrogen ion is generated from the hydrogen in the reformed gas ($H_2$ $2H^+ + 2e^-$). When the oxidation gas is supplied to the cathode, the cathode generates an oxygen ion from the oxygen in the oxidation gas so that power is generated within the fuel cell assembly 14. At the same time, the cathode generates water from the above hydrogen ion and oxygen ion (($1/2$)$O_2 + 2H^+ + 2e^- H_2O$). Most of the water is generated as steam because it absorbs the heat generated within the fuel cell assembly 14.

The cathode of the fuel cell assembly 14 is connected to a cathode air pump 18. The cathode air pump 18 supplies a cathode gas to the cathode. A cathode off-gas flow path 20 is furnished to connect the cathode to the reforming side of the reformer 12. A cathode off-gas is discharged from the cathode and supplied to the reforming side via the cathode off-gas flow path 20.

The flow path connecting the cathode air pump 18 to the cathode is provided with a three-way valve 22. The three-way valve 22 is connected to the reforming side of the reformer 12 via a bypass flow path 24. Therefore, when the setup for the three-way valve 22 is changed, the cathode gas can be directly supplied to the reforming side without via the cathode of the fuel cell assembly 14.

At the time of power generation, heat is generated within the fuel cell assembly 14. Therefore, a cooling air pump 26 is furnished to cool the fuel cell assembly 14. The cooling air pump 26 supplies a cooling gas to the fuel cell assembly 14 to air-cool the fuel cell assembly 14.

For a normal operation, the setup for the three-way valve 22 is adjusted as indicated in FIG. 1A so that the cathode gas delivered from the cathode air pump 18 is forwarded to the cathode of the fuel cell assembly 14. The cathode off-gas discharged from the cathode contains the oxygen that did not react within the cathode in addition to the steam generated by the cathode. The fuel cell system 10 according to the present embodiment delivers the cathode off-gas to the reforming side of the reformer 12 via the cathode off-gas flow path 20, and supplies the steam and oxygen in the cathode off-gas as the material for invoking the reforming reaction indicated by Equations (1) and (2). The overall system efficiency can be enhanced by using the steam and oxygen in the cathode off-gas for a reforming reaction as described above.

Meanwhile, the fuel cell assembly 14 operates at a predetermined operating temperature to generate power. Therefore, when the system starts up, it is necessary to warm up the fuel cell assembly 14 until it is warmed to the operating temperature. If the cooling gas is supplied to the fuel cell assembly 14 in this instance, the warm-up efficiency lowers. Therefore, the cooling gas supply from the cooling air pump 26 to the fuel cell assembly 14 is shut off as indicated in FIG. 1B.

The setup for the three-way valve 22 is changed at the time of system startup (warm-up) so that the cathode gas delivered from the cathode air pump 18 is supplied to the reforming side of the reformer 12 via the bypass flow path 24. The cathode air pump 18 is controlled so that an adequate amount of air is supplied to the reforming side for the purpose of completely oxidizing the gasoline supplied to the reforming side. In this manner, a large amount of oxygen-containing air is supplied to the reforming side. Catalyst combustion (combustion based on the reforming catalyst) and gas-phase combustion (combustion based on a fuel/oxidation gas mixture) occur on the reforming side so that the supplied gasoline is completely oxidized. Water and carbon dioxide ($CO_2$) are then generated as indicated in Equation (3) below:

$$C_8H_{18} + (25/2)O_2 8CO_2 + 9H_2O \qquad (3)$$

As described above, the cathode gas delivered from the cathode air pump 18 is used as lean-burn air on the reforming side at the time of warm-up. As a result, the temperature of the reformer 12 rises due to heat generation by complete oxidation. In addition, the high-temperature gas (steam and $CO_2$) derived from complete oxidation is supplied to the anode of the fuel cell assembly 14 via the reformed gas flow path 16. Therefore, it is possible to warm up the system including the reformer 12 and fuel cell assembly 14.

After completion of warm-up, the setup for the three-way valve 22 is changed to the state indicated in FIG. 1A for the purpose of delivering the cathode gas from the cathode air pump 18 to the cathode of the fuel cell assembly 14. In addition, the cooling air pump 26 supplies the cooling gas to the fuel cell assembly 14 to conduct a normal operation. Whether or not the warm-up is completed is determined by judging whether the operating temperature of the fuel cell assembly 14 is reached by the value detected by a temperature sensor that is mounted on the fuel cell assembly 14.

The cathode gas delivered from the cathode air pump 18 is at a normal temperature. Therefore, if the cathode gas is supplied to the cathode during warm-up, the cathode gas cools the fuel cell assembly 14 so that the warm-up efficiency of the fuel cell assembly 14 may decrease. Before completion of warm-up, the present embodiment allows the cathode gas to flow to the bypass flow path 24. Therefore, the cathode gas is not supplied to the cathode. Thus, it is possible to inhibit the fuel cell assembly 14 from being cooled by the cathode gas and provide enhanced warm-up efficiency. Consequently, the fuel cell assembly 14 can be completely warmed up within a short period of time. Before completion of warm-up, the cooling gas supply from the cooling air pump 26 is shut off so that the warm-up efficiency increases.

Further, a large amount of oxygen-containing air is delivered from the cathode air pump 18 to the reforming side during warm-up in order to provide a lean burn of the gasoline on the reforming side and achieve complete oxidation. The heat generated by such complete oxidation is then used to properly warm up the interior of the system including the reformer 12 and fuel cell assembly 14.

As described above, the present embodiment furnishes the bypass flow path 24, which bypasses the cathode of the fuel cell assembly 14, so that the cathode gas is directly supplied to the reforming side of the reformer 12 without being forwarded to the cathode before completion of warm-up. Therefore, the present embodiment inhibits the cathode gas from cooling the fuel cell assembly 14. Consequently, the warm-up efficiency can be enhanced so as to complete a warm-up process for the fuel cell assembly 14 within a short period of time.

Alternatively, the cathode gas delivered to the bypass flow path 24 may be supplied to the combustion side of the reformer 12 during warm-up and used as the combustion air for the combustion side. The combustion on the combustion side is then quickened so as to enhance the warm-up efficiency of the system.

The cooling medium for cooling the fuel cell assembly 14 is not limited to the cooling gas. One typical alternative is to cool the fuel cell assembly 14 with cooling water or other liquid and shut off the supply of the cooling water or the like to the fuel cell assembly 14 during warm-up.

Second Embodiment

Figure 2A:
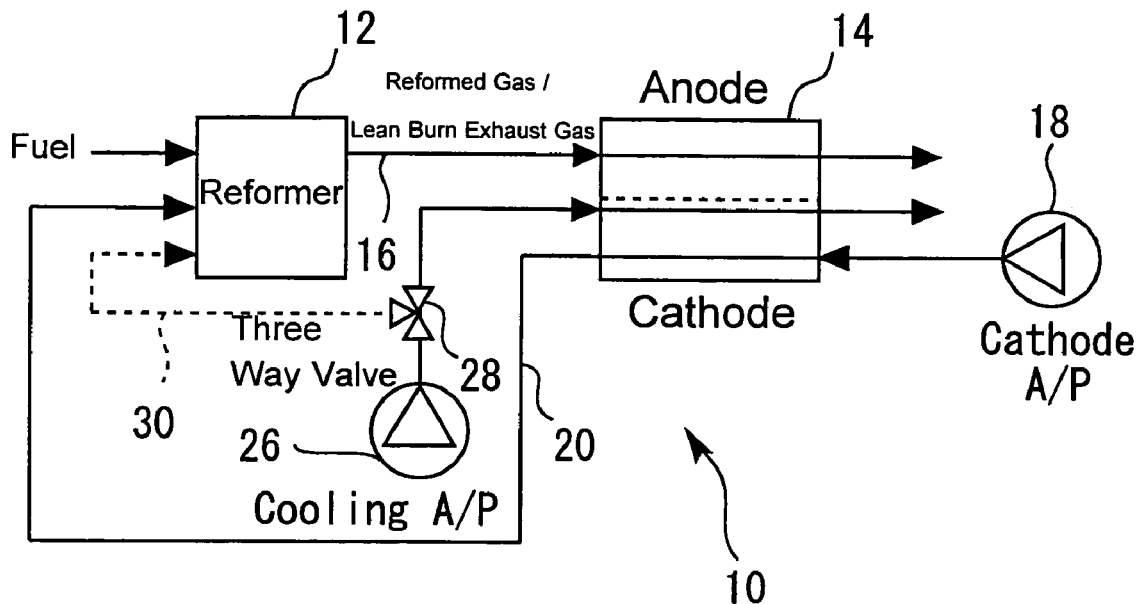
FIGS. 2A and 2B are schematic diagrams illustrating the configuration of a fuel cell system according to a second embodiment of the present invention.
Figure 2B:
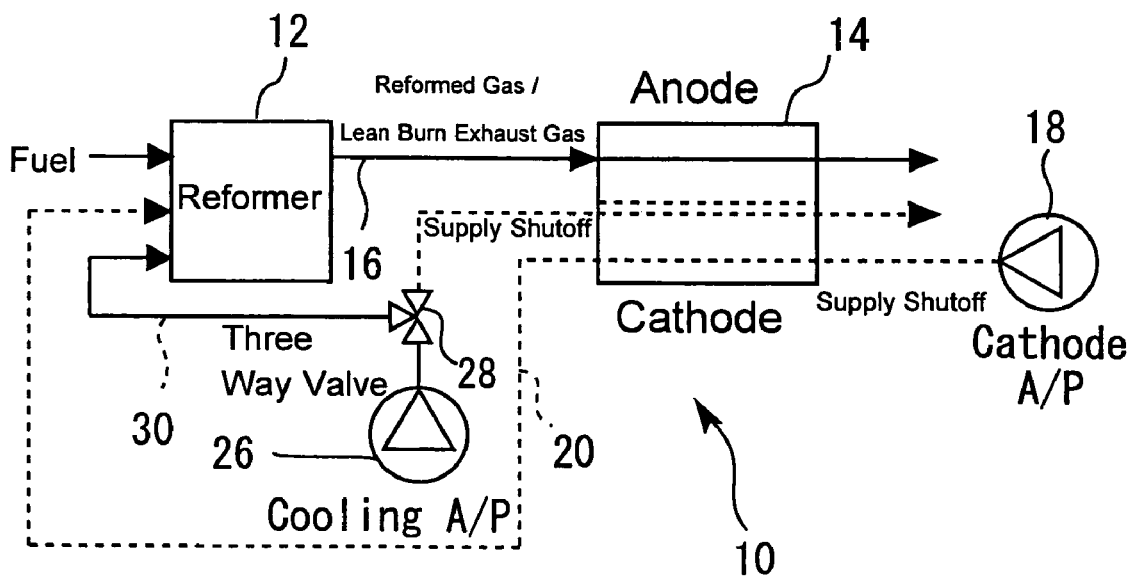

A second embodiment of the present invention will now be described. FIGS. 2A and 2B are schematic diagrams illustrating the configuration of a fuel cell system 10 according to the second embodiment. The basic configuration of the second embodiment of the fuel cell system 10 is the same as that of the first embodiment.

As is the case with the first embodiment, the second embodiment of the fuel cell system 10 includes the cathode off-gas flow path 20 for the purpose of supplying the cathode off-gas to the reforming side of the reformer 12. Further, the second embodiment also includes the cooling air pump 26 for the purpose of cooling the fuel cell assembly 14. In addition, the second embodiment includes a three-way valve 28, which is installed in a flow path for supplying the cooling gas to the fuel cell assembly 14. Another flow path 30 is furnished so that the cooling gas separated by the three-way valve 28 is forwarded to the reforming side of the reformer 12.

For a normal operation, the cathode gas delivered from the cathode air pump 18 is forwarded to the cathode of the fuel cell assembly 14 as indicated in FIG. 2A. The cathode off-gas discharged from the cathode is supplied to the reforming side of the reformer 12 via the cathode off-gas flow path 20. Further, the setup for the three-way valve 28 is adjusted so that the cooling gas delivered from the cooling air pump 26 is supplied to the fuel cell assembly 14. This makes it possible, as is the case shown in FIG. 1A, to supply the steam and oxygen in the cathode off-gas to the reforming side as the materials for a reforming reaction, and cool the fuel cell assembly 14 with the cooling gas.

At startup, the cathode gas supply from the cathode air pump 18 is shut off as indicated in FIG. 2B. Further, the setup for the three-way valve 28 is changed so that the cooling gas delivered from the cooling air pump 26 flows to flow path 30. The fuel cell assembly 14 is then bypassed so that the cooling gas is supplied to the reforming side of the reformer 12. This shuts off the cooling gas supply to the fuel cell assembly 14. The cooling air pump 26 is then controlled so that an adequate amount of air is supplied to the reforming side for the purpose of completely oxidizing the gasoline supplied to the reforming side. In this manner, a large amount of oxygen-containing air is supplied to the reforming side.

When the supply of the cathode gas and cooling gas to the fuel cell assembly 14 is shut off at system startup as described above, it is possible to inhibit the cathode gas and cooling gas from cooling the fuel cell assembly 14. Therefore, the warm-up efficiency can be enhanced to complete a warm-up process for the fuel cell assembly 14 within a short period of time. Further, a large amount of oxygen-containing air is delivered from the cooling air pump 26 to the reforming side in order to provide a lean burn of the gasoline on the reforming side and achieve complete oxidation as is the case with the first embodiment. Consequently, it is possible to properly warm up the interior of the system including the reformer 12 and fuel cell assembly 14.

As described above, the second embodiment shuts off the supply of the cathode gas and cooling gas to the fuel cell assembly 14 before completion of warm-up. It is therefore possible to inhibit the cathode gas and cooling gas from cooling the fuel cell assembly 14. Consequently, the warm-up efficiency can be enhanced to complete a warm-up process for the fuel cell assembly 14 within a short period of time. Further, the cooling gas is supplied to the reforming side of the reformer 12 before completion of warm-up. Therefore, it is possible to completely oxidize the gasoline supplied to the reforming side and properly warm up the interior of the system including the reformer 12 and fuel cell assembly 14.

Alternatively, only the supply of the cooling gas to the fuel cell assembly 14 may be shut off during warm-up while the cathode gas is supplied to the fuel cell assembly 14. This makes it possible to supply the cathode gas in an appropriate manner depending on the warm-up state of the fuel cell assembly 14.

An alternative is to supply the cooling gas, which is directed to flow path 30, to the combustion side of the reformer 12 and use the cooling gas as the combustion air for the combustion side. This makes it possible to quicken the combustion on the combustion side and enhance the warm-up efficiency of the system.

Third Embodiment

Figure 3A:
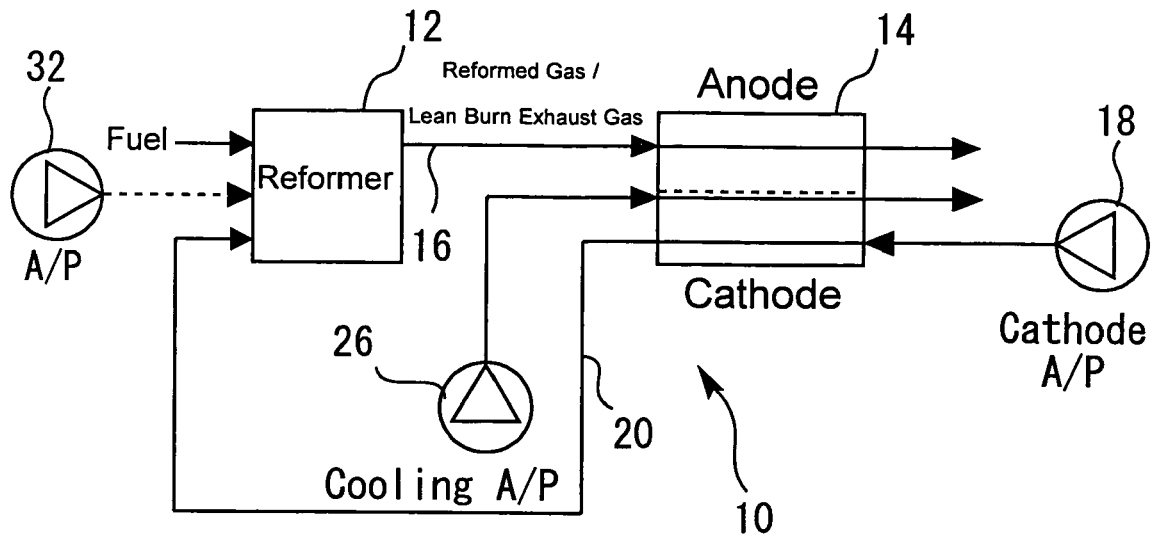
FIGS. 3A and 3B are schematic diagrams illustrating the configuration of a fuel cell system according to a third embodiment of the present invention.
Figure 3B:
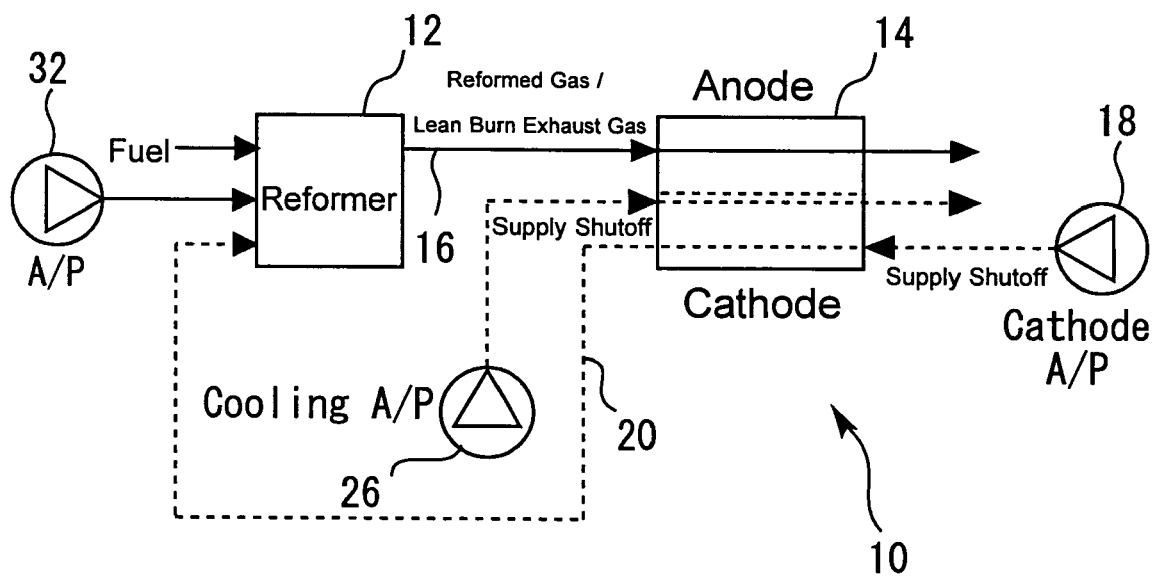

A third embodiment of the present invention will now be described. FIGS. 3A and 3B are schematic diagrams illustrating the configuration of a fuel cell system 10 according to the third embodiment of the present invention. The basic configuration of the third embodiment of the fuel cell system 10 is the same as that of the first embodiment.

As is the case with the first embodiment, the third embodiment of the fuel cell system 10 includes the cathode off-gas flow path 20 for the purpose of supplying the cathode off-gas to the reforming side of the reformer 12. Further, the third embodiment also includes the cooling air pump 26 for the purpose of cooling the fuel cell assembly 14. In addition, the third embodiment includes an air pump 32 for supplying air to the reforming side of the reformer 12 during warm-up.

For a normal operation, the cathode gas delivered from the cathode air pump 18 is forwarded to the cathode of the fuel cell assembly 14 as indicated in FIG. 3A. The cathode off-gas discharged from the cathode is supplied to the reforming side of the reformer 12 via the cathode off-gas flow path 20. Further, the cooling gas delivered from the cooling air pump 26 is supplied to the fuel cell assembly 14. This makes it possible, as is the case shown in FIG. 1A, to supply the steam and oxygen in the cathode off-gas to the reforming side as the materials for a reforming reaction, and cool the fuel cell assembly 14 with the cooling gas.

At startup, the cathode gas supply from the cathode air pump 18 is shut off as indicated in FIG. 3B. Further, the cooling gas supply from the cooling air pump 26 is also shut off. The air pump 32 then operates to supply a large amount of oxygen-containing air to the reforming side and provide a lean burn for the purpose of completely oxidizing the gasoline supplied to the reforming side. As described above, the air pump 32 is furnished to supply air for a lean burn during warm-up. The air supply from the air pump 32 is shut off during a period other than the warm-up period.

Since the cathode gas supply is shut off at startup, it is possible to inhibit the cathode gas from cooling the fuel cell assembly 14. The warm-up efficiency can then be enhanced to complete a warm-up process for the fuel cell assembly 14 within a short period of time. Further, a large amount of oxygen-containing air is delivered from the air pump 32 to the reforming side in order to provide a lean burn of the gasoline on the reforming side and achieve complete oxidation as is the case with the first embodiment. Consequently, it is possible to properly warm up the interior of the system including the reformer 12 and fuel cell assembly 14.

As described above, the third embodiment shuts off the cathode gas supply before completion of warm-up. It is therefore possible to inhibit the cathode gas from cooling the fuel cell assembly 14. Consequently, the warm-up efficiency can be enhanced to complete a warm-up process for the fuel cell assembly 14 within a short period of time. Further, a large amount of air is delivered from the air pump 32 to the reforming side before completion of warm-up. Therefore, the gasoline supplied to the reforming side can be completely oxidized to properly warm up the interior of the system including the reformer 12 and fuel cell assembly 14.

Alternatively, the air supply from at least either the cathode air pump 18 or cooling air pump 26 may be shut off during warm-up. This makes it possible to supply the cathode gas and cooling gas in an appropriate manner depending on the warm-up state of the fuel cell assembly 14.

INDUSTRIAL APPLICABILITY

As described above, the fuel-cell system according to the present invention makes it possible to enhance the warm-up efficiency and is useful for various fuel cell system applications.

The invention claimed is:

1. A fuel cell system comprising:
   a reforming section for receiving a hydrocarbon fuel supply and generating a hydrogen-containing reformed gas by making use of a reforming reaction;
   a fuel cell assembly for generating power after causing an anode to receive the reformed gas and causing a cathode to receive an oxygen-containing cathode gas;
   cathode off-gas supply means for supplying a cathode off-gas, which is discharged from the cathode, to the reforming section; and
   bypass means for bypassing the cathode and directly supplying the cathode gas to the reforming section at the time of system warm-up.

2. The fuel cell system according to claim 1, further comprising:
   a cathode gas supply means for supplying oxygen containing a cathode gas to the cathode; and
   a control means for controlling said cathode gas supply means to operate said bypass means at the time of system warm-up and to supply oxygen of an amount to oxidize hydrocarbon fuel in the reforming section completely.

3. The fuel cell system according to claim 1, further comprising:
   a temperature detecting means for detecting a temperature of the fuel cell;
   a determination means for making a determination as to whether a temperature detected by the temperature detecting means reaches a predetermined value; and
   a control means for controlling to end an operation of said bypass means when said determination means determines that a temperature has reached a predetermined value.

4. The fuel cell system according to claim 1, further comprising:
   cooling fluid supply means for supplying a cooling fluid to the fuel cell assembly; and
   cooling fluid supply shutoff means for shutting off the supply of the cooling fluid at the time of system warm-up.

5. A fuel cell system comprising:
   a reforming section for receiving a hydrocarbon fuel supply and generating a hydrogen-containing reformed gas by making use of a reforming reaction;
   a fuel cell assembly for generating power after causing an anode to receive the reformed gas and causing a cathode to receive an oxygen-containing cathode gas;
   cathode off-gas supply means for supplying a cathode off-gas, which is discharged from the cathode, to the reforming section;
   cooling gas supply means for supplying a cooling gas to the fuel cell assembly; and
   means for bypassing the fuel cell assembly and supplying the cooling gas to the reforming section at the time of system warm-up.

6. The fuel cell system according to claim 5, further comprising cathode gas supply shutoff means for shutting off the supply of the cathode gas to the cathode at the time of system warm-up.

7. The fuel cell system according to claim 5, further comprising:
   a control means for controlling said cooling gas supply means to operate said bypass means at the time of system warm-up and to supply oxygen of an amount to oxidize hydrocarbon fuel in the reforming section completely.

8. A fuel cell system comprising:
   a reforming section for receiving a hydrocarbon fuel supply and generating a hydrogen-containing reformed gas by making use of a reforming reaction;
   a fuel cell assembly for generating power after causing an anode to receive the reformed gas and causing a cathode to receive an oxygen-containing cathode gas;
   cathode off-gas supply means for supplying a cathode off-gas, which is discharged from the cathode, to the reforming section and/or cooling gas supply means for supplying a cooling gas to the fuel cell assembly;
   gas supply shutoff means for shutting off at least either the supply of the cathode gas to the cathode or the supply of the cooling gas to the fuel cell assembly at the time of system warm-up; and
   lean-burn gas supply means for supplying a gas to the reforming section to provide a lean burn of the hydrocarbon fuel at the time of system warm-up.

9. The fuel cell system according to claim 8, wherein said gas shutoff means shuts off both the supply of the cathode gas to the cathode and the supply of the cooling gas to the fuel cell assembly at the time of system warm-up.

* * * * *